United States Patent [19]

Ackley

[11] Patent Number: 4,562,561
[45] Date of Patent: Dec. 31, 1985

[54] ULTRASONIC PEST REPELLER

[76] Inventor: Paul S. Ackley, 1270 S. Stelling, Cupertino, Calif. 95014

[21] Appl. No.: 505,470

[22] Filed: Jun. 17, 1983

[51] Int. Cl.[4] .............................................. H04B 1/02
[52] U.S. Cl. ...................................................... 367/139
[58] Field of Search .......................... 367/139; 43/124; 116/22 A; 340/384 E

[56] References Cited

U.S. PATENT DOCUMENTS

| | | | |
|---|---|---|---|
| 3,886,492 | 5/1975 | White | 367/139 |
| 4,001,817 | 1/1977 | Squires | 340/384 E |
| 4,163,966 | 8/1979 | Mounce | 43/124 |
| 4,206,448 | 6/1980 | Davis | 340/384 E |
| 4,386,341 | 5/1983 | Yamamoto | 367/139 |
| 4,392,215 | 7/1983 | Hall | 367/139 |

*Primary Examiner*—Theodore M. Blum
*Attorney, Agent, or Firm*—Townsend and Townsend

[57] ABSTRACT

Apparatus for use as an ultrasonic pest repeller capable of having three different modes of operation for the purpose of generating ultrasonic signals for use in repelling all types of pests. The apparatus includes a circuit coupled at its output with one or more ultrasonic transducers and the circuit operates to generate electronic signals which are applied to the transducer or transducers for creating the ultrasonic signals in any one of three different modes of operation including a first mode in which a steady, modulated signal is generated, a second mode in which a dual pulse signal is generated with modulation of each pulse, and a third mode in which a signal is swept over a band of frequencies and is modulated simultaneously with the sweeping action. The circuit includes a rectifier for providing a DC regulated voltage. Moreover, the circuit includes components for generating a 60 Hz modulating voltage and a pair of timers which are coupled together and operated when a three-pole, three-position switch is selectively actuated, one of the timers being operable to generate a predetermined on-off voltage used to control the operation of the other timer, the output of the other timer supplying power to the transducer or transducers in the selected mode of operation of the circuit.

7 Claims, 4 Drawing Figures

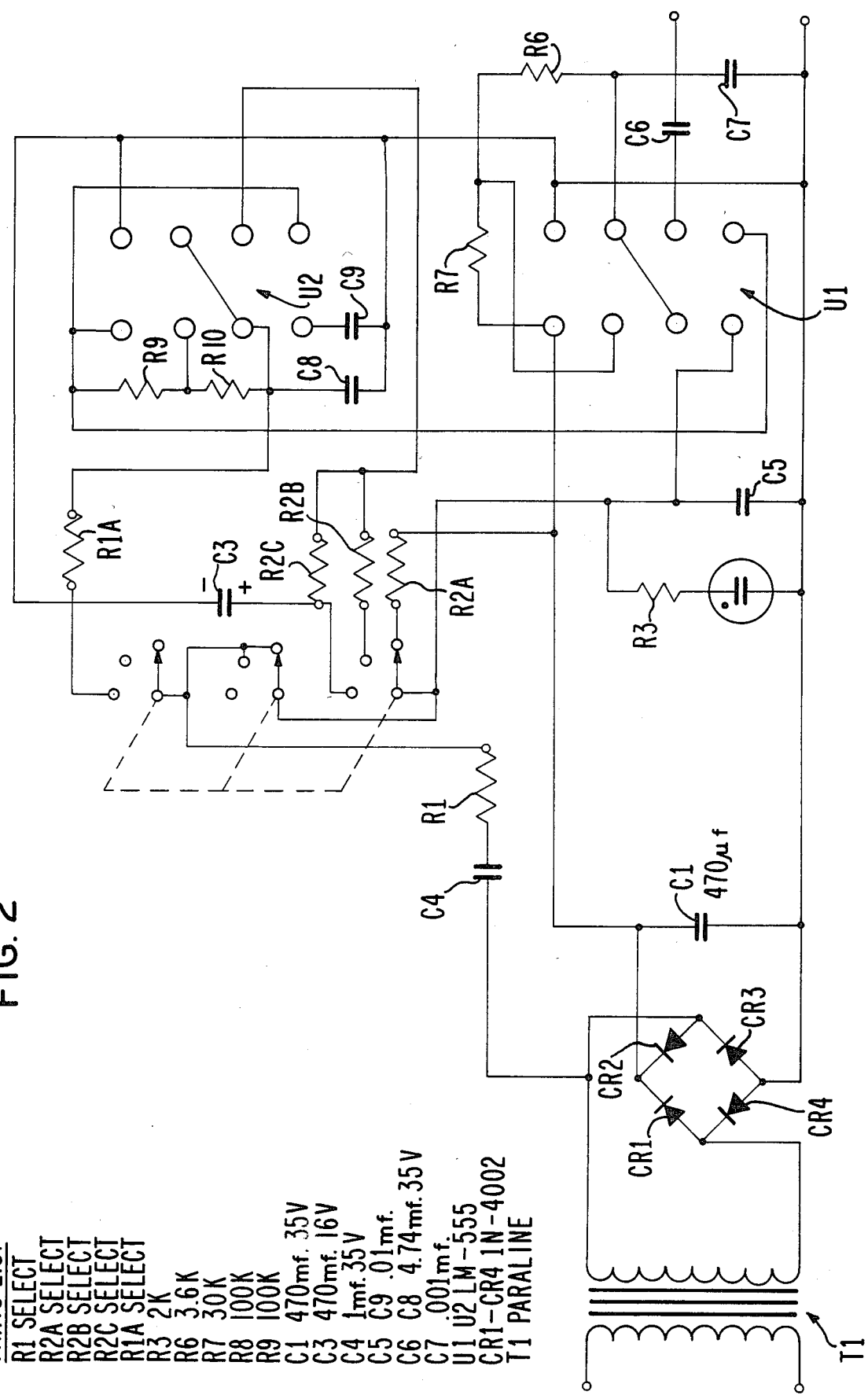

ULTRASONIC PEST REPELLER

BACKGROUND OF THE INVENTION

This invention relates to the generation of ultrasonic signals to be applied in the vicinity of pests, such as rodents and insects for the purpose of disrupting and irritating their ultrasonic receptors to the extent that they are repelled and seek to escape from the area in which the ultrasound is functioning.

DESCRIPTION OF PRIOR ART

The fact that rodents, insects, birds, etc., use Ultrasound and have the capability of transmitting and receiving sounds at Ultrasonic frequencies has been well established by entomological studies. FIG. 1 illustrates a common graph of the sound characteristics for both rodents and insects. The graph indicates their sensitivity for a range of frequencies from 1 Khz to 91 Khz. Their most sensitive range in the ultrasonic spectrum would start at 20 Khz and extend to 40 Khz.

Some pest repellers are constructed to produce a steady ultrasonic frequency which is modulated to produce a band of frequencies. Since pests apparently build up a tolerance to a steady frequency, other pest repellers are pulsed in an attempt to compensate for this tolerance. Neither method has been found to be completely adequate to repel pests because all pests are not necessarily sensitive to the particular band of frequencies being transmitted. This is true even for pests of the same species. Thus, a need exists for an improved repeller to avoid the drawbacks of conventional repeller apparatus.

Prior U.S. patents relating to this invention are U.S. Pat. Nos.: 3,058,103; 3,891,962; 4,163,966; 4,178,578; 4,219,884.

SUMMARY OF THE INVENTION

The present invention is directed to apparatus including a circuit having an output capable of being coupled to one or more ultrasonic transducers wherein the circuit operates to produce electronic signals applied to the transducer or transducers in any one of three different modes of operation. In the first mode, a steady frequency signal is produced which is modulated by a signal at a lower frequency, such as a 60 Hz signal. The steady frequency signal, when modulated, lies in a band of ultrasonic frequencies. This mode of operation is effective for repelling flying insects.

In a second mode of operation, the circuit operates to provide a pulsing between two different steady frequencies so that the signal applied to a transducer at the output of the circuit alternates between an upper steady frequency and a lower steady frequency, the steady frequencies both being modulated by the lower frequency mentioned above so that steady frequency signals lie in specific frequency bands.

In a third mode of operation, the circuit operates to generate a modulated band of ultrasonic frequencies which sweep back and forth over a predetermined range of the ultrasonic spectrum as it sweeps, the signal is also modulated, thus providing a bandwidth for the signal at each sweep frequency thereof. This mode is effective for repelling all types of pests.

The primary object of the present invention is to provide a circuit of the type described wherein the circuit can operate in any one of the three modes of operation so as to be capable of repelling insects of specific types or of all types to thereby avoid the problems of conventional repellers and to provide an efficient means of getting rid of pests, including rodents, birds and flying insects quickly and easily and with a minimum investment in equipment.

Other objects of this invention will become apparent as the following specification progresses, reference being had to the accompanying drawings attached hereto.

IN THE DRAWINGS

FIG. 2 is a schematic diagram of the circuit of the present invention showing the way in which it is coupled to a transducer for generating ultrasonic signals;

OPERATION

The SCHEMATIC DRAWING, FIG. 2 represents the circuit having electronic components used to perform the functions of this invention.

A D.C. regulated voltage is provided by the conventional circuit comprised of T1, CR1, CR2, CR3, CR4, VR1, C1 & C2. This insures that the circuit which is voltage sensitive will function properly when connected to A.C. power sources wherein the "line" voltage is subject to variations.

R3 & LED constitute an indicator light to indicate that the circuit has power or is "ON".

C3 & R4 constitute a decoupling circuit to prevent feedback which might cause the circuit to oscillate.

Figure 1:
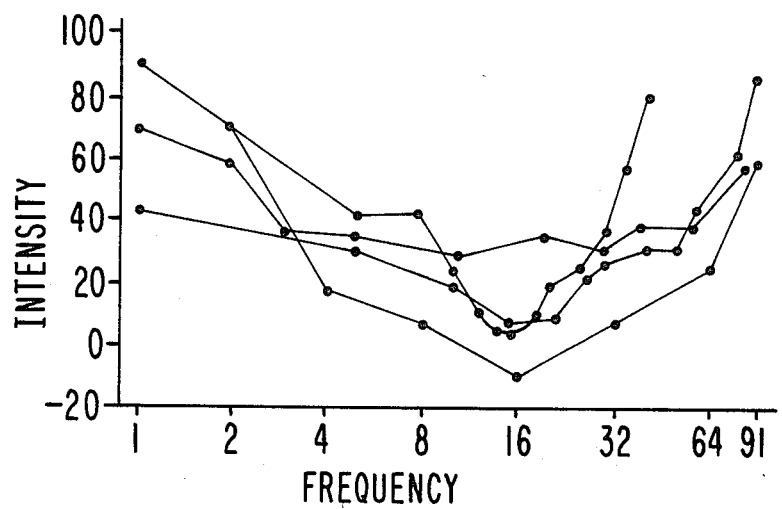
FIG. 1 is a plot of sound intensity versus sound sensitivity of common pests.
Figure 3A:
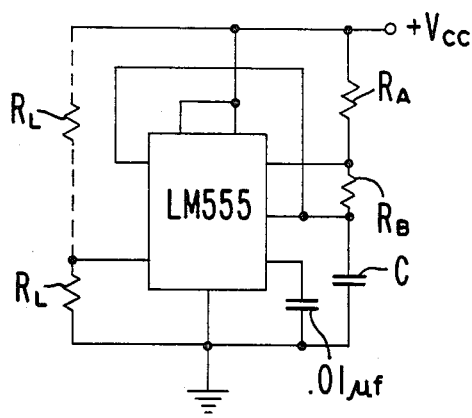
FIG. 3a is a schematic view of a timer used as one of the components of the circuit of FIG. 2, showing the way in which the terminals of the timer are coupled in a typical application.

U1 is an I.C. Timer the frequency of which is determined by C7, R6 & R7. A suitable timer is one known as LM-555 made and sold by National Semiconductor of Santa Clara, Calif. A schematic diagram of such a diagram is shown as an integrated circuit in FIG. 3a. The output of U1, Pin 3 supplies power to a transducer 10 or transducers through C6 and also drives the base of an amplifier which provides additional power to remotely located transducers.

U2 is an I.C. Timer, typically an LM-555, the frequency of which is determined by elements R9, R10 & C8. This timer generates a predetermined ON and OFF voltage which appears at it's output Pin 3. It also generates a ramp voltage which appears at Pin 6. These voltages are illustrated by Figure three.

60 Hz voltage means including T1 through C4, R1, C5, R3 and the bridge rectifier CR1. CR2, CR3, & CR4 provide a 60 Hz voltage to the control Pin 5 of U1. Since the device is voltage sensitive this varying voltage causes the frequency of the device at the output of U1 to shift slightly so that a band of frequencies is being produced and transmitted by the transducers.

Sw1 is a three pole, three position switch which is used to cause the circuit of the present invention to operate in any one of three different modes as follows:

Sw1 in Position Three

Figure 3B:
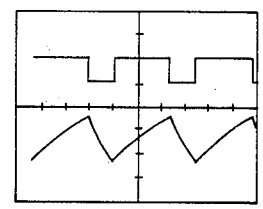
FIG. 3b is a plot of the output signal at the output terminal of the timer of FIG. 3a along with a plot of the ramp voltage available at another terminal of the timer.

U2 is in a pulsing mode as determined by R9, R10 & C8. A ramp voltage appears at U2 Pin 6 as illustrated in FIG. 3 showing the ramp voltage at the capacitor C8. This ramp voltage is connected through SW1 position 3 through resistor R12 to U1 Pins 2 & 6. As the ramp voltage of U2 increases it causes the frequency of U1 to decrease and as the ramp voltage returns to zero, the frequency of U1 returns to it's starting point in the ultrasonic frequency spectrum. In this mode the output of U1 and Q1 become a sweeping frequency alternating back and forth from the start of the ultrasonic frequency spectrum of approximately 20 KHz to a higher predetermined ultrasonic frequency. This mode of operation permits the full output power of the device to appear at every increment of the selected ultrasonic range. This constitutes an improvement in the prior art because the full power of the device is concentrated on the sensitive receptor of a pest as it sweeps across it's sensitive receptor and becomes resonant there with.

SW1 in Position Two

U2 together with R9, R10 & C8 constitute a pulsing device which provides a pulsing positive voltage at the output of U2, Pin 3. This voltage via R2A & Sw1 is applied to U1 Pin 5. U1 normally oscillates at a predetermined ultrasonic frequency as determined by R6, R7 & C7. When U1 pulses ON, the voltage applied to U1 Pin 5, which is voltage sensitive, shifts the output frequency to a predetermined lower frequency in the ultrasonic spectrum. When U2 output turns 'OFF', the output of U1 returns to it's frequency of oscillation. Thus the device alternately shifts back and forth between two frequencies in the ultrasonic spectrum. This is an advance in the state of the art. Prior pulsing devices pulsed "OFF" & "ON" rather than shifting to another frequency in the ultrasonic spectrum.

SW1 in Position One

R2A is a preselected resistor which provides a D.C. voltage to Pin 5 of U1. Since U1 is voltage sensitive the applied voltage at Pin 5 of U1 determines the output frequency of U1. In this mode the device is a steady ultrasonic unit as described herein under the prior arts paragraph, page two line three. U2 and it's associated components are not activated in this mode.

All three modes of operation may be modulated by the application of a 60 Hz voltage from T1 through C4, selected resistor R1 to Pin 5 of U1, the return path being through R5 and C5 in parallel through the bridge rectifier CR1, CR2, CR3, & CR4 to T1. This causes the frequencies described above to shift slightly so that a narrow band of frequencies is generated and transmitter in lieu of a single frequency.

In a first mode of operation, a typical signal at the output of the circuit shown in FIG. 2 has a fundamental frequency of 22 kHz. Upon being modulated by a 60 Hz signal, the bandwidth typically is 20 microseconds which translates into a frequency band of 18 kHz to 30 kHz.

In the second mode of operation, the typical fundamental signal pulses are 22 kHz and 35 kHz. For the lower frequency signal pulse, the modulation causes a bandwidth in the range of 18 kHz to 30 kHz, and for the higher frequency signal pulse, the bandwith range is typically 28 kHz to 50 kHz.

In the third mode of operation, the fundamental frequency sweeps typically from 18 kHz to 33 kHz. At the upper end of this sweep range, the modulation causes the signal to have a bandwith typically of 31 kHz to 42 kHz. At the lower end of the sweep range, the bandwidth is typically 16 kHz to 21 kHz.

I claim:

1. Apparatus for use in repelling animal pests comprising:
a circuit having means for generating a first electronic signal in an ultrasonic frequency range, a second electronic signal in an ultrasonic frequency range, and a third electronic signal in an ultrasonic frequency range; said circuit further including means including a switch coupled with said signal generating means for selectively actuating the latter to cause the generation of a selected one of the first, second and third signals, there being means for modulating the selected signal, whereby the selected signal will have a bandwidth as a function of the modulation thereof, said circuit having an output, said first signal having a fundamental frequency of approximately 22 kHz and, upon being modulated by said modulating means, being variable in frequency in the range of approximately 18 kHz to 30 kHz, said second signal having a pair of fundamental frequencies of approximately 22 kHz and 35 kHz, respectively, said second signal, upon being modulated by said modulating means, having its lower fundamental frequency variable from approximately 18 kHz to 30 kHz and having its higher fundamental frequency variable from approximately 28 kHz to 50 kHz, the second signal changing between the lower and higher fundamental frequencies at a predetermined rate, said third signal having a plurality of fundamental frequencies in the range of 18 kHz to 33 kHz, there being means in the circuit for sweeping through said fundamental frequencies at a predetermined rate, said third signal upon being modulated, having each of its fundamental frequencies variable over a respective frequency range, the lowermost fundamental frequency of approximately 18 kHz, having a frequency range of approximately 16 kHz to 21 kHz, the uppermost fundamental frequency of approximately 33 kHz, having a frequency range of approximately 31 kHz to 42 kHz; and
an ultrasonic transducer coupled to the output of the circuit for converting the electronic signals to ultrasonic signals.

2. Apparatus as set forth in claim 1, wherein the circuit includes a timer means providing said signal generating means, said timer means having an output terminal defining said output of the circuit, the output frequency of the timer means being voltage dependent, said circuit including means for applying a predetermined voltage to the timer means to provide a steady output signal at the output of the circuit.

3. Apparatus as set forth in claim 2, wherein said modulating means is coupled to said timer means for modulating the output signal thereof over a given bandwidth of frequencies.

4. Apparatus as set forth in claim 1, wherein said signal generating means includes a first timer means and a second timer means, the second timer means having an output terminal providing an output, pulsing signal providing on/off control of the first timer means, said first timer means having means for causing the output signal thereof to change from a first frequency to a second frequency, means for coupling said output, pulsing signal of the second timer means to the first timer means for causing the output signal of the first timer means to change from said first frequency to the second frequency and then back again in a continuous manner.

5. Apparatus as set forth in claim 4, wherein the modulating means is coupled to the first timer means to cause the signal thereof to have a bandwidth at each of the first and second frequencies, respectively.

6. Apparatuas set forth in claim 1, wherein said signal generating means includes a first timer means and a second timer means coupled with the first timer means, the first timer means having an output signal capable of varying in frequency over a frequency range, the second timer means having means for generating a ramp voltage, there being means coupling the ramp voltage of the second timer means to the first timer means to cause the signal of the first timer means to decrease as the ramp voltage increases and to increase as the ramp voltage decreases, whereby the output signal of the first timer means becomes a signal sweeping over a bandwidth of frequencies.

7. Apparatus as set forth in claim 6, wherein the modulating means is coupled to the first timer means to modulate the output signal of the first timer means as the output signal sweeps over said frequency range.

* * * * *